United States Patent
Kang et al.

(10) Patent No.: US 10,193,779 B2
(45) Date of Patent: Jan. 29, 2019

(54) APPARATUS AND METHOD FOR CONTROLLING DOWNLINK THROUGHPUT IN COMMUNICATION SYSTEM

(71) Applicant: Samsung Electronics Co., Ltd., Suwon-si, Gyeonggi-do (KR)

(72) Inventors: Seongryong Kang, Seongnam-si (KR); Jonghyune Kim, Seoul (KR); Dongjin Lee, Suwon-si (KR); Jungah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 15/137,422

(22) Filed: Apr. 25, 2016

(65) Prior Publication Data
US 2016/0315841 A1    Oct. 27, 2016

(30) Foreign Application Priority Data
Apr. 27, 2015    (KR) .................. 10-2015-0059018

(51) Int. Cl.
| | |
|---|---|
| H04L 1/00 | (2006.01) |
| H04L 12/26 | (2006.01) |
| H04L 12/841 | (2013.01) |
| H04L 12/825 | (2013.01) |

(52) U.S. Cl.
CPC ........ H04L 43/0864 (2013.01); H04L 47/283 (2013.01); *H04L 43/16* (2013.01); *H04L 47/25* (2013.01)

(58) Field of Classification Search
CPC ... H04L 43/0864; H04L 47/283; H04L 43/16; H04L 47/25
USPC ......................................................... 370/238
See application file for complete search history.

(56) References Cited

U.S. PATENT DOCUMENTS

| | | | |
|---|---|---|---|
| 6,360,271 B1 * | 3/2002 | Schuster | H04J 3/0632 370/516 |
| 6,456,967 B1 * | 9/2002 | Yeom | H04L 1/0006 704/220 |
| 2002/0105951 A1 * | 8/2002 | Hannuksela | H04L 29/06027 370/389 |
| 2003/0219037 A1 | 11/2003 | Toskala et al. | |
| 2005/0025194 A1 * | 2/2005 | Adjakple | H04W 56/0015 370/516 |
| 2006/0268708 A1 | 11/2006 | Speight et al. | |

(Continued)

FOREIGN PATENT DOCUMENTS

| | | |
|---|---|---|
| EP | 2009943 B1 | 4/2011 |
| WO | 2008/156198 A2 | 12/2008 |
| WO | 2009/146726 A1 | 12/2009 |

OTHER PUBLICATIONS

Wai Kay Leong et al., "Mitigating Egregious ACK Delays in Cellular Data Networks by Eliminating TCP ACK Clocking", 2013.

*Primary Examiner* — Sai Ming Chan
(74) *Attorney, Agent, or Firm* — Jefferson IP Law, LLP

(57) ABSTRACT

An operation method of a server in a communication system, an operation method of an electronic device, the server, and the electronic device are provided. The operation method of the server includes determining a variation type of a buffering delay based on a packet transmission delay of a terminal, determining control information for controlling an uplink transmission rate of the terminal according to the variation type, and transmitting the control information.

20 Claims, 11 Drawing Sheets

(56) References Cited

U.S. PATENT DOCUMENTS

| | | | |
|---|---|---|---|
| 2009/0190527 A1* | 7/2009 | Marinier | H04L 1/0002 |
| | | | 370/328 |
| 2013/0250765 A1 | 9/2013 | Ehsan et al. | |
| 2014/0250168 A1 | 9/2014 | Damola et al. | |
| 2014/0362868 A1* | 12/2014 | Hirota | H04J 3/0673 |
| | | | 370/412 |
| 2015/0043337 A1 | 2/2015 | Kanamarlapudi et al. | |
| 2015/0063104 A1 | 3/2015 | Zhu et al. | |
| 2015/0156129 A1* | 6/2015 | Tsuruoka | H04L 47/193 |
| | | | 370/235 |
| 2016/0315841 A1* | 10/2016 | Kang | H04L 43/0864 |

* cited by examiner

APPARATUS AND METHOD FOR CONTROLLING DOWNLINK THROUGHPUT IN COMMUNICATION SYSTEM

CROSS-REFERENCE TO RELATED APPLICATION(S)

This application claims the benefit under 35 U.S.C. § 119(a) of a Korean patent application filed on Apr. 27, 2015 in the Korean Intellectual Property Office and assigned Serial number 10-2015-0059018, the entire disclosure of which is hereby incorporated by reference.

TECHNICAL FIELD

The present disclosure relates to controlling a transmission rate of transport control protocol (TCP) traffic in a communication system.

BACKGROUND

In modern society, the use of internet content such as webpage access, video streaming, and social networking service (SNS) site access has increased geometrically in a communication network due to an increase in the use of various smart devices including smart phones and tablet personal computers (PCs). Particularly, because of an increase in wireless devices capable of multitasking, an amount of used data in uplink as well as downlink is rapidly increasing at present.

In general, the uplink has more limitations on the use of resources such as a scheduling request or multiple input multiple output (MIMO) support in a cellular radio network such as long term evolution (LTE) compared to the downlink. Accordingly, an available bandwidth for uplink data transmission may be much smaller than that of the downlink even though the uplink data transmission uses a carrier of the same bandwidth as the downlink. Because of asymmetry between the uplink and the downlink, a possibility of the generation of uplink congestion due to an uplink traffic increase gradually becomes higher. The uplink congestion may seriously influence a downlink transmission rate of most web-based Internet applications.

A data transmission scheme of most web-based internet applications corresponds to a transport control protocol (TCP), and a TCP algorithm used by a commercial system such as Linux and Windows may necessarily include a scheme often called acknowledgement (ACK) clocking. Since a new data packet can be transmitted after the ACK is received in ACK-based self-clocking, a transmission rate of a server is automatically controlled according to a bandwidth of a bottleneck and a speed at which the ACK arrives at the server. Therefore, for smooth downlink packet transmission, the uplink ACK needs to arrive at the server at a proper time point.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for controlling a transmission rate in a communication system.

Another aspect of the present disclosure is to provide an apparatus and a method for improving a transmission rate of a downlink packet in a communication system.

Another aspect of the present disclosure is to provide an apparatus and a method for reducing a transmission delay of acknowledgement (ACK) of a downlink packet in a communication system.

Another aspect of the present disclosure is to provide an apparatus and a method for estimating a packet buffering delay time in a terminal in a communication system.

Another aspect of the present disclosure is to provide an apparatus and a method for controlling an available uplink bandwidth in a communication system.

Another aspect of the present disclosure is to provide an apparatus and a method for detecting a buffering variation type of an uplink packet in a communication system.

Another aspect of the present disclosure is to provide an apparatus and a method for masking a buffering delay estimation error and an uplink transmission rate size estimation error in a communication system.

In accordance with an aspect of the present disclosure, an operation method of a server in a communication system is provided. The operation method includes determining a variation type of a buffering delay based on a packet transmission delay of a terminal, determining a parameter for controlling an uplink transmission rate of the terminal according to the variation type, and transmitting the parameter.

In accordance with another aspect of the present disclosure, a server in a communication system is provided. The server includes a variation type determination unit configured to determine a packet transmission delay from a terminal and determine a variation type of a buffering delay by using the packet transmission delay, and a parameter determination unit configured to control a parameter value for controlling a transmission rate according to the determined variation type of the buffering delay.

According to an embodiment of the present disclosure, it is possible to stably estimate an uplink buffering state and an available uplink bandwidth size in spite of a state change of a wireless network by accurately estimating a buffering delay time of a packet in the terminal before the packet is transmitted and an available uplink bandwidth and detecting a variation type of the estimated buffering delay in a communication system.

Further, according to an embodiment of the present disclosure, it is possible to improve a downlink transmission rate without any reduction in an uplink transmission rate to effectively maintain an uplink buffer state according to an uplink buffering state and an available bandwidth size when uplink congestion is generated.

In addition, according to an embodiment of the present disclosure, it is possible to estimate an available uplink bandwidth size even when a transport control protocol (TCP) time stamp option is turned off.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure describes a technology for controlling a transmission rate in a communication system. Particularly, the present disclosure describes a technology for controlling a transmission rate to prevent reduction in downlink throughput when data processing in an uplink direction has congestion.

Figure 1:
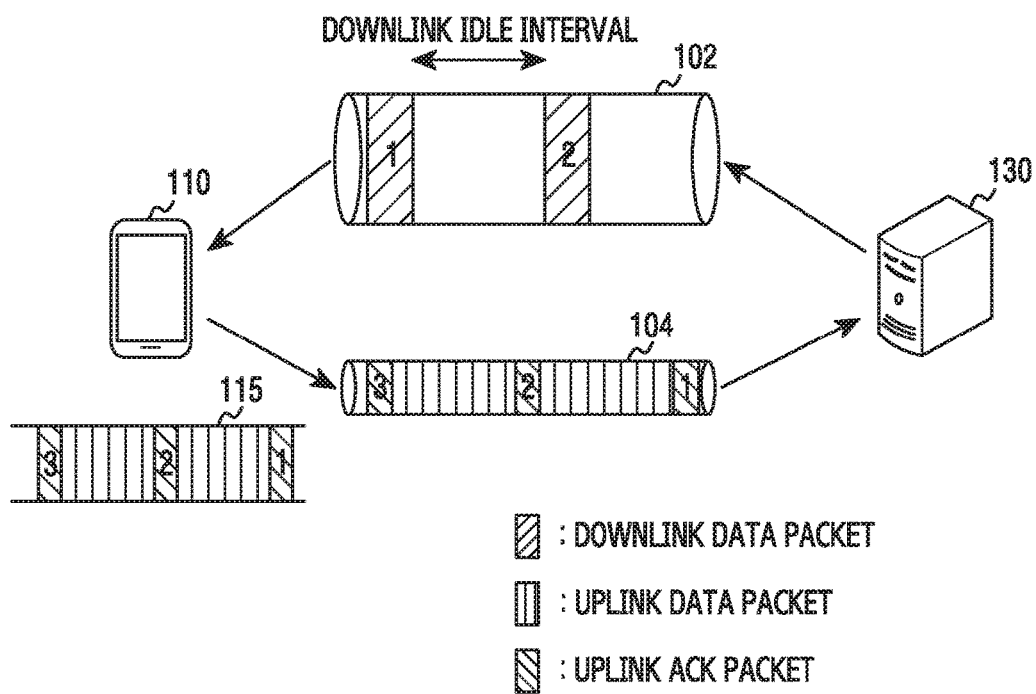
FIG. 1 illustrates an example of downlink transmission by an acknowledgement (ACK) packet delay in a communication system according to an embodiment of the present disclosure.

FIG. 1 illustrates an example of downlink transmission by an acknowledgement (ACK) packet delay according to an embodiment of the present disclosure. FIG. 1 illustrates downlink transmission according to a communication protocol considered in the present disclosure.

Referring to FIG. 1, a terminal 110 and a server 130 transmit/receive packets through a downlink channel 102 and an uplink channel 104. In FIG. 1, the uplink channel 104 and the downlink channel 102 are illustrated in the form of pipes having different widths to express bandwidth asymmetry. That is, the pipe width approximates an available bandwidth.

The terminal 110 includes a buffer 115 for uplink packets. An application packet passes through buffers of several stages within the terminal before being actually transmitted to a physical link, but only one logical buffer is expressed herein for convenience. The buffer 115 may be used for an ACK packet for downlink data as well as an uplink data packet. The data packet and the ACK packet are input into the buffer 115 according to a created order without distinction therebetween. Accordingly, in the buffer 115, the ACK packets are buffered between the uplink data packets. Therefore, the ACK packet may be transmitted after the data packets input into the buffer 115 are transmitted ahead of the ACK packet. If transmission of the uplink data is delayed due to a bandwidth limitation of the uplink channel 104, an interval between the ACK packets may be larger within the buffer 115. In other words, transmission of the ACK packet is delayed.

The server 130 transmits the downlink data packet to the terminal 110. The server 130 may transmit an amount of downlink packets determined by a transmission rate control algorithm of a transport control protocol (TCP). However, when the ACK is not received, the server 130 cannot transmit a new downlink packet. In this case, as illustrated in FIG. 1, a downlink idle interval exists where there is no downlink data transmission during a predetermined interval after a first data packet is transmitted in response to a first ACK packet. The downlink idle interval is created due to non-reception of a second ACK after the reception of the first ACK. That is, even though the downlink bandwidth is sufficient, new downlink data may not be transmitted due to non-reception of the uplink ACK.

As described above, when the delay of the ACK packet buffered in the terminal 110 increases by the bandwidth limitation of the uplink channel 104, ACK clocking of the TCP may be delayed by the buffering delay. Accordingly, the downlink channel 102 has a latency time, and downlink throughput may decrease as much as the increase in the downlink latency time.

As a method of reducing an ACK packet delay time by the buffering of the terminal 110, an uplink data transmission speed of the terminal 110 may be reduced. When the uplink data transmission speed decreases, an amount of buffered uplink data packets decreases and, accordingly, a latency time of the ACK packet in the buffer 115 may relatively decrease. To this end, the server 130 may control the uplink data transmission speed of the terminal 110 through a flow control parameter of the TCP transmitted to the terminal 110. The control parameter includes information used for determining the uplink data transmission speed of the terminal 110. For example, the control parameter may include a reception buffer size of the server 130. That is, the terminal 110 schedules uplink transmission in consideration of the reception buffer size of the server 130. Accordingly, when the server 130 informs the terminal 110 of the reception buffer size which has decreased, the terminal 110 reduces an uplink transmission rate.

Figure 2:
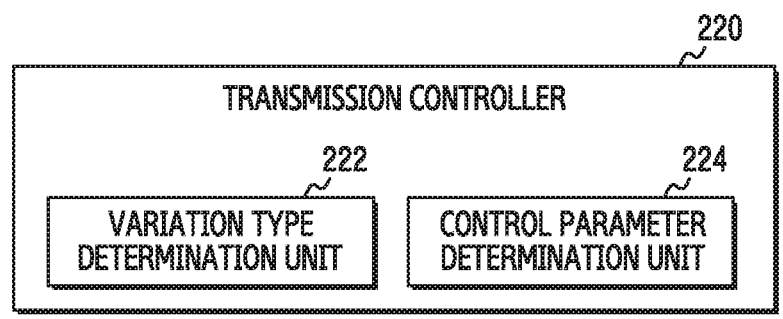
FIG. 2 is a block diagram illustrating a device for controlling a transmission rate according to an embodiment of the present disclosure.

In order to control the transmission rate, the communication system according to an embodiment of the present disclosure may include a network entity illustrated in FIG. 2.

FIG. 2 is a block diagram illustrating a device for controlling a transmission rate according to an embodiment of the present disclosure. For convenience of the description, the device for controlling the transmission rate according to various embodiments of the present disclosure may be referred to as a "transmission controller".

Referring to FIG. 2, the transmission controller 220 may include a variation type detection unit 222 and a control parameter determination unit 224. The transmission controller 220 detects, through the variation type determination unit 222, a variation type of the buffering delay estimated based on an uplink direction delay from the terminal 110 to the server 130, a round trip time (RTT) between the terminal 110 and the server 130, and a data packet reception speed. The transmission controller 220 determines, through the control parameter determination unit 224, a TCP control parameter optimized for a current network condition by using the estimated buffering delay, an available uplink bandwidth, and the variation type of the buffering delay received from the variation type determination unit 222. For example, the control parameter may include a reception buffer size of the server 130.

Figure 3:
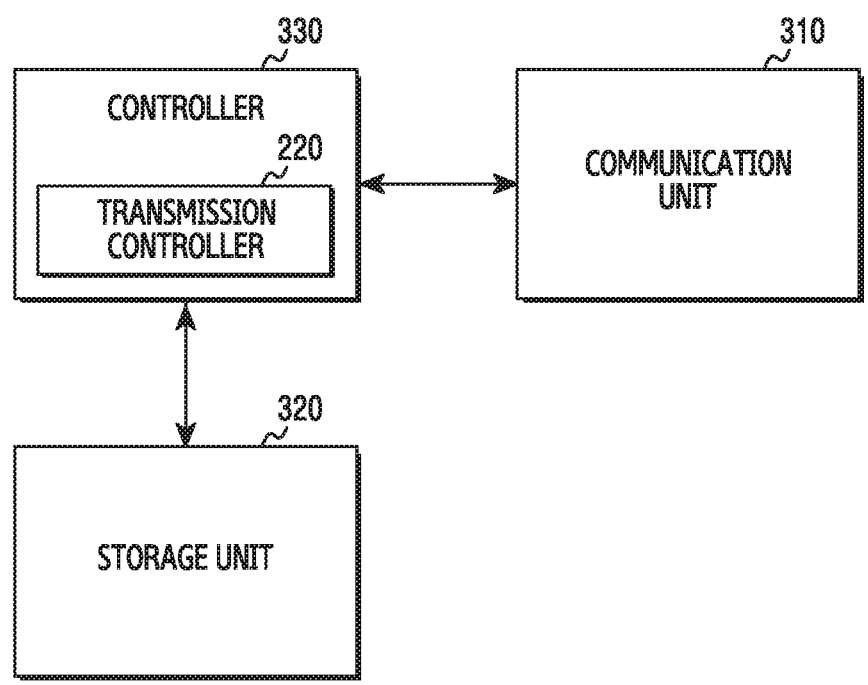
FIG. 3 is a block diagram illustrating a device for controlling a transmission rate including the device of FIG. 2 according to an embodiment of the present disclosure.

FIG. 3 is a block diagram illustrating a device for controlling a transmission rate, including the device of FIG. 2, according to an embodiment of the present disclosure. FIG. 3 illustrates a configuration of an application server or a proxy server including the transmission controller 220.

Referring to FIG. 3, the device may include a communication unit 310, a storage unit 320, and a controller 330.

The communication unit 310 performs a function of transmitting/receiving a signal. That is, the communication unit 310 transmits/receives a signal provided from the controller 330 and the storage unit 320. Accordingly, the communication unit 310 may be referred to as a transmitter, a receiver, a transceiver, or a communication unit.

The storage unit 320 stores a basic program, an application program, and setting information for the operation of the device for controlling the transmission rate in the communication system. Particularly, the storage unit 320 may store packet information. Further, the storage unit 320 provides data stored therein according to a request of the controller 330.

The controller 330 controls general operations of the device for controlling the transmission rate in the communication system. For example, the controller 330 controls the device for controlling the transmission rate in the communication system to perform processes illustrated in FIGS. 6 to 9. The controller 330 may perform a transmission rate control through the transmission controller 220 to control the transmission rate in the communication system. The operation of the transmission controller 220 according to an embodiment of the present disclosure is described below.

The transmission controller 220 calculates an average unidirectional delay of packets received in a period (T). Further, the transmission controller 220 calculates an average reception speed of data packets that arrive every period and calculates a minimum round trip time value. The transmission controller 220 updates a minimum value of the unidirectional delay value. The transmission controller 220 calculates a buffering delay and an average buffering delay in the buffer of the terminal to each packet before transmission. The transmission controller 220 detects a variation type of the buffering delay measured for one period. The transmission controller 220 compares the buffering delay with a threshold value. When the buffering delay is larger than the threshold value, the transmission controller 220 identifies the variation type of the buffering delay. When the variation type is determined as a first type, the transmission controller 220 updates the control parameter value. The transmission controller 220 updates the control parameter value. When the variation type corresponds to a third type based on a result of the determination of the variation type, the transmission controller 220 may control the parameter value by using a random variable. When the variation type corresponds to the third type, the transmission controller 220 may determine that uplink direction congestion is expected but a current buffering delay is not continuously deteriorated. Accordingly, it is required to mitigate the current congestion but, in order to reduce a possibility of underrun of the terminal buffer, a packet control parameter value is reduced to an uplink transmission rate through a probability distribution having an average of p. When the parameter value is controlled using the probability distribution, the parameter value changes according to a predetermined probability and the transmission rate can be more flexibly controlled compared to a case where the control parameter value is fixed. According to an embodiment of the present disclosure, an equal distribution of p=0.5 may be used. According to an embodiment of the present disclosure, the transmission controller may use another value of p and may use another probability distribution such as an exponential distribution or a Pareto distribution.

When the variation type does not correspond to the first type or the third type based on the result of the determination of the variation type, that is, when the variation type corresponds to a second type, the transmission controller 220 maintains the current control parameter value.

When the buffering delay is not larger than the threshold value, that is, when the buffering delay is equal to or smaller than the threshold value, the transmission controller 220 identifies the variation type and, when the variation type of the buffering delay corresponds to the first type, maintains the current control parameter value. When the variation type corresponds to the second type, the transmission controller 220 increases the control parameter by a set value. When the variation type corresponds to the third type, the transmission controller 220 increases the control parameter by using the random variable. When the variation type corresponds to the third type, the transmission controller 220 may prevent an instant state change due to the uplink congestion, which may be generated, by increasing the control parameter value of only some packets. To this end, the control parameter values of some packets are increased using probability distribution having an average p. According to an embodiment of the present disclosure, an equal distribution of p=0.5 may be used. According to an embodiment of the present disclosure, the transmission controller 220 may use another value of p, and use another probability distribution such as exponential distribution or Pareto distribution.

The transmission controller 220 may belong to one entity included in the communication system according to various embodiments. For example, the transmission controller 220 may be included in a proxy server or an application server illustrated in FIGS. 4A to 4C below.

Figure 4A:
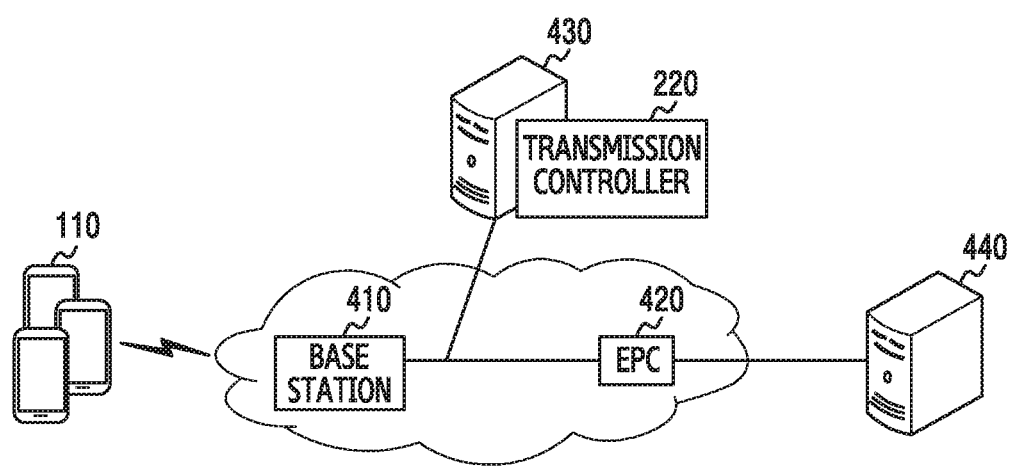
FIGS. 4A to 4C illustrate a configuration of a communication system according to an embodiment of the present disclosure.
Figure 4B:
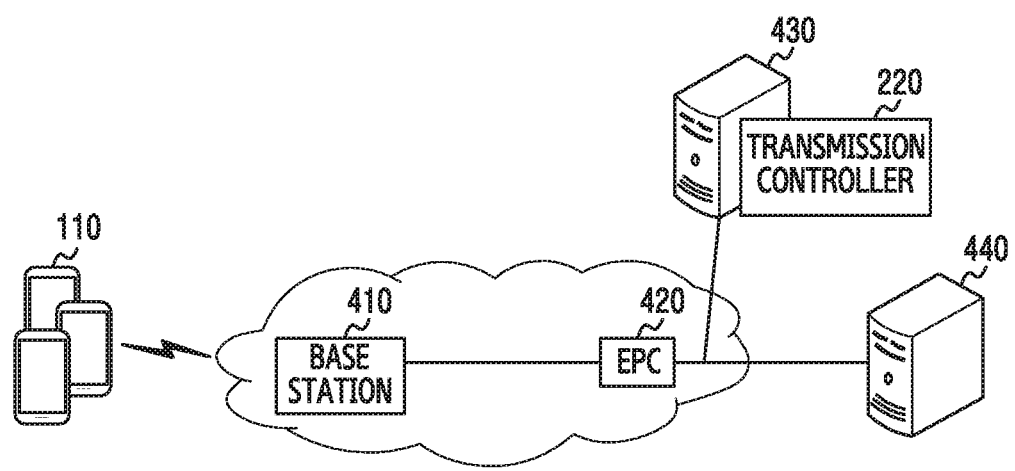
Figure 4C:
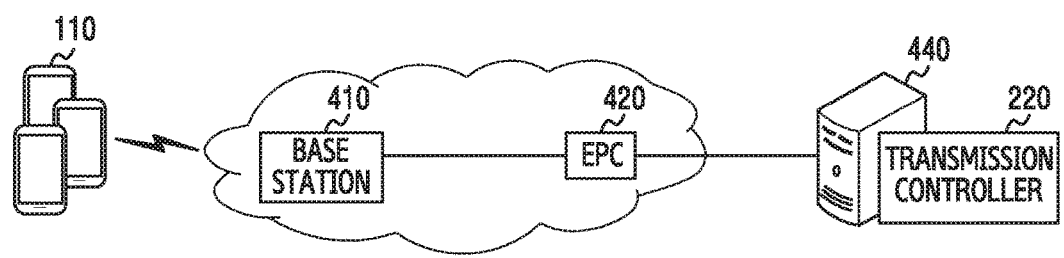

FIGS. 4A to 4C illustrate a configuration of the communication system according to an embodiment of the present disclosure.

Referring to FIGS. 4A to 4C, the communication system according to an embodiment of the present disclosure may include the terminal 110, an evolved node B (eNB) 410 (i.e., a base station), an evolved packet core (EPC) 420, a server 430, and an application server 440. The eNB 410 is an access node of the terminal 110. The EPC 420 is an access network and may include at least one of a serving gateway, a packet gateway, and a policy and charging rules function (PCRF). The server 430 is an entity for improving a transmission performance of application traffic such as a video or web content provided to the user. The application server 440 is an entity for providing a service of an application level provided to the terminal 110.

According to an embodiment of the present disclosure, the server 430 may be arranged on a wireless network with the purpose of improving an application service and efficient use of network resources by a communication service provider or a content provider authorized by the communication service provider. The server 430 may be referred to as a proxy server. The server 430 may provide, for example, an edge server function of a content delivery network (CDN), a caching function, and a TCP proxy function, or other various traffic optimization functions, and may be located in the access network in a separate equipment form or its functions may be integrated into the existing access network equipment. The server 430 may be located in the access network in the separate equipment form or its functions may be integrated into the existing wireless network equipment.

According to an embodiment of the present disclosure, as illustrated in FIG. 4A, the server 430 may include the transmission controller 220 to improve the transmission performance of application traffic. Further, the server 430 may be located in a cell-site of a base station. The server 430 may be located in the cell-site of the base station or a centralized radio access network (RAN) site in which a plurality of base stations are gathered. Particularly, the server 430 located near the base station according to an embodiment of the present disclosure may reduce a buffering time of the ACK packet in the buffer of the terminal 110 due to the uplink data packet by reducing an uplink data transmission speed of the TCP of the terminal 110.

According to an embodiment of the present disclosure, as illustrated in FIG. 4B, the server 430 may be located in a core-site. The server 430 located in the core-site may reduce a buffering time of the ACK packet in the buffer of the terminal 110 due to the uplink data packet by reducing an uplink data transmission speed of the TCP of the terminal 110.

According to an embodiment of the present disclosure, as illustrated in FIG. 4C, the server 430 may not exist and the application server 440 of the service provider may include the transmission controller 220. The transmission controller 220 included in the application server 440 may reduce a buffering time of the ACK packet in the buffer of the terminal 110 due to the uplink data packet by reducing an uplink data transmission speed of the TCP of the terminal 110.

As described above, according to various embodiments of the present disclosure, the transmission controller 220 may be included in a separate server (for example, proxy server) located in the cell-site or the core-site or included in the application server providing a service. Hereinafter, for convenience of the description, the present disclosure describes a case where the transmission controller 220 is configured as the server 430 corresponding to a separate entity as an example. However, the present disclosure may be equally applied to a case where the transmission controller 220 is included in the application server.

Figure 5:
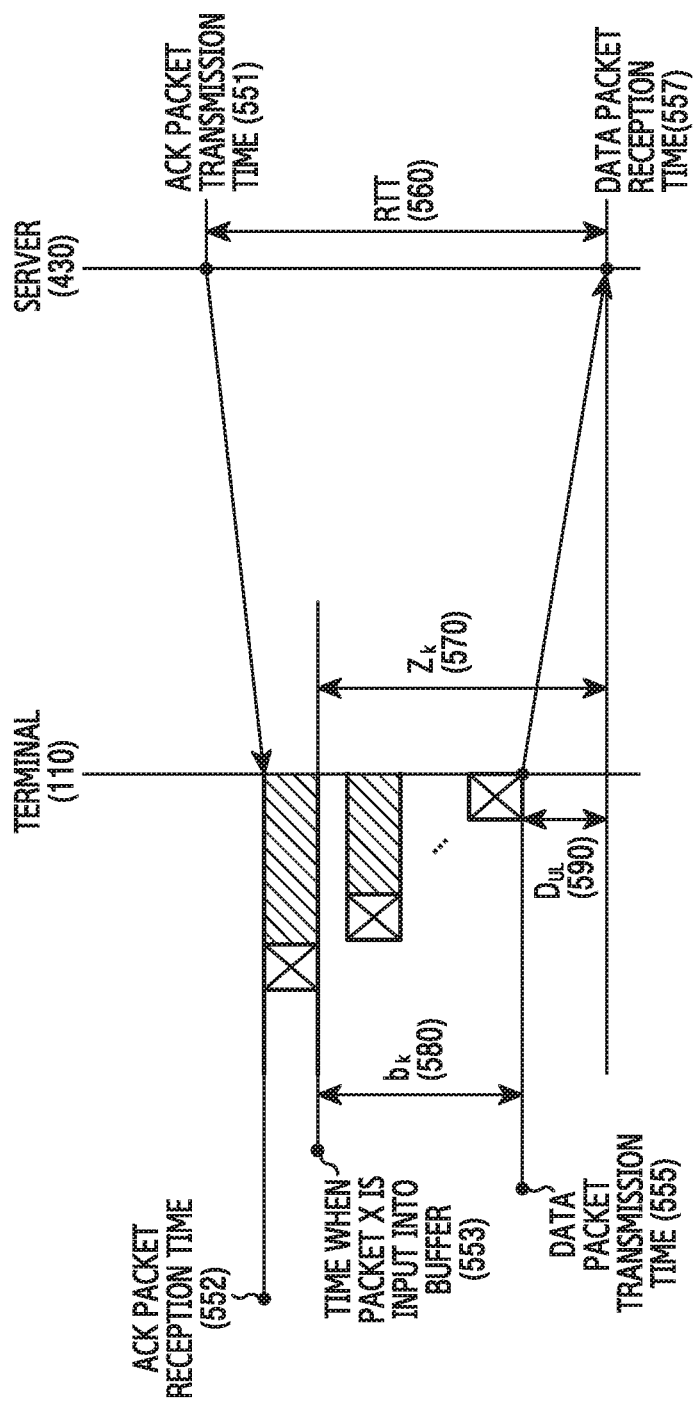
FIG. 5 illustrates an operation for measuring a unidirectional packet delay and a round trip time according to an embodiment of the present disclosure.

According to various embodiments of the present disclosure, the transmission controller 220 may use a unidirectional packet delay and a round trip time in order to control a transmission rate. The unidirectional packet delay and the round trip time may be determined as illustrated in FIG. 5.

As described above, according to various embodiments of the present disclosure, a server in a communication system may comprise a variation type determination unit configured to determine a packet transmission delay from a terminal, and determine a variation type of a buffering delay based on the packet transmission delay. Also, the server may comprise a control parameter determination unit configured to control a control information value for controlling a transmission rate according to the determined variation type of the buffering delay.

Also, the variation type determination unit may determine the packet transmission delay based on a difference between a time when the server receives a response signal from the terminal and a time when the terminal receives a packet from the server.

Also, the variation type determination unit may determine a packet round trip time between the terminal and the server as the packet transmission delay, and the packet round trip time may be determined based on a difference between a time when the server transmits a packet to the terminal and a time when the server receives a response signal of the packet from the terminal.

Also, the packet transmission delay may be determined based on a sum of the buffering delay of the terminal and an uplink delay transmission time of the terminal, and the buffering delay of the terminal may be determined based on a difference between the packet transmission delay and a minimum value of packet transmission delay.

Also, the variation type determination unit may determine the variation type based on whether a buffering delay of each of a plurality of packets increases compared to a previous packet, and when a ratio of the packets having the increased buffering delay compared to the previous packets is larger than a threshold value, the variation type determination unit may determine that the variation type corresponds to the increase in the buffering delay.

Also, the variation type determination unit may determine the variation type based on buffering delay difference values between a plurality of packets and previous packets thereto and a buffering delay difference value between a first packet and a last packet, and when a value generated by dividing the difference value between the buffering delay of the last received packet and the buffering delay of the first received packet among the received packets, by a sum of the values generated by comparing the buffering delays of the packets and the buffering delays of the previous packets thereto, is larger than a threshold value, the variation type determination unit may determine that the variation type corresponds to an increase in the buffering delay.

Also, the controller may measure a packet reception speed, and the packet reception speed may be generated based on dividing a product of packets received for one period and a maximum segment size expressed by a bit value by the period.

Also, when the buffering delay is larger than a threshold value and the determined variation type of the buffering delay corresponds to an increasing variation type of the buffering delay for a plurality of packets received from the terminal, or when the buffering delay does not correspond to the increasing variation type or a non-increasing variation type of the buffering delay, the controller may determine the control information based on a product of a packet reception speed and a minimum round trip time.

Also, when the buffering delay is larger than a threshold value and the determined variation type of the buffering delay corresponds to a non-increasing variation type or when the buffering delay is not larger than the threshold value and the determined variation type of the buffering delay corresponds to an increasing variation type, the controller may maintain current control information.

Also, when the buffering delay is not larger than a threshold value and the determined variation type of the buffering delay does not correspond to an increasing variation type, the controller may increase current control information by a predetermined value.

Also, when the determined variation type of the buffering delay corresponds to a variation type which is not determined to be an increasing variation type or a non-increasing variation type, the controller may determine the control information based on a random variable.

As described above, according to various embodiments of the present disclosure, an electronic device in a communication system may comprise a receiver configured to receive control information from a server. Also, the electronic device may comprise a transmitter configured to transmit an uplink packet based on the control information, wherein the control information may be generated to be used when the server determines a variation type of a buffering delay based on a packet transmission delay of the electronic device, and wherein the control information may control a transmission rate of the electronic device according to the variation type.

Also, the packet transmission delay of the electronic device may correspond to a sum of the buffering delay of the electronic device and an uplink delay transmission time of the electronic device, and the buffering delay of the electronic device may be determined based on a difference between the packet transmission delay of the electronic device and a minimum value of packet transmission delay.

Also, the variation type may be determined based on whether the buffering delay of each of a plurality of packets increases compared to a previous packet, and when a ratio of packets having the increased buffering delay compared to the previous packets is larger than a threshold value, it may be determined that the variation type corresponds to the increase in the buffering delay.

Also, the variation type may be determined based on buffering delay difference values between a plurality of packets and previous packets thereto and a buffering delay difference value between a first packet and a last packet, and when a value generated by dividing the buffering delay difference value between the buffering delay of the last received packet and the buffering delay of the first received packet among the packets received by the server, by a sum of the values generated by comparing the buffering delays of the packets and the buffering delays of the previous packets thereto, is larger than a threshold value, it may be determined that the variation type corresponds to the increase in the buffering delay.

FIG. 5 illustrates unidirectional packet delay measurement and round trip time measurement according to an embodiment of the present disclosure. FIG. 5 illustrates a process in which the server 430 measures the packet buffering delay within the terminal 110 when the terminal 110 uploads data to the server 430.

Referring to FIG. 5, the server 430 transmits the ACK packet through the downlink in response to a data packet (not shown) from the terminal 110. The terminal 110 inputs the data packet (expressed by X in FIG. 5) into the buffer in response to the downlink ACK packet. Thereafter, when uplink packets (in the shaded area of FIG. 5) input into the buffer prior to the data packet expressed by X are all transmitted, the data packet expressed by X is transmitted to the server 430. Then, the server 430 receives the data packet expressed by X.

Here, a time point when the server 430 transmits the ACK packet to the terminal 110, that is, through the downlink, may be defined as an ACK packet transmission time 551, a time point when the terminal 110 receives the downlink ACK packet may be defined as an ACK packet reception time 552, a time point when the terminal 110 inputs the data packet expressed by X into the buffer may be defined as a time point 553, a time point when the terminal 110 transmits the data packet may be defined as a data packet transmission time 555, and a time point when the server 430 receives the data packet may be defined as a data packet reception time 557. In this case, the RTT 560 is defined as a time length from the ACK packet transmission time 551 to the data packet reception time 557. Further, a buffering delay $b_k$ 580 is defined as a time length from the time 553 at which the data packet expressed by X is input into the buffer to the time 555 at which the data packet is transmitted. A time length from the data packet transmission time 555 of the data packet expressed by X to the reception time 557 at which the data packet is received by the server is defined as an uplink transmission delay time $D_{UL}$ 590 which is spent for transmitting the uplink packet. A value generated by adding the buffering delay $b_k$ 580 and the uplink transmission delay time $D_{UL}$ is defined as a unidirectional packet delay time $Z_k$ 570. The packet delay time $Z_k$ 570 is a value generated by subtracting the time 553 at which the packet is input into the buffer from the packet reception time 557.

Figure 6:
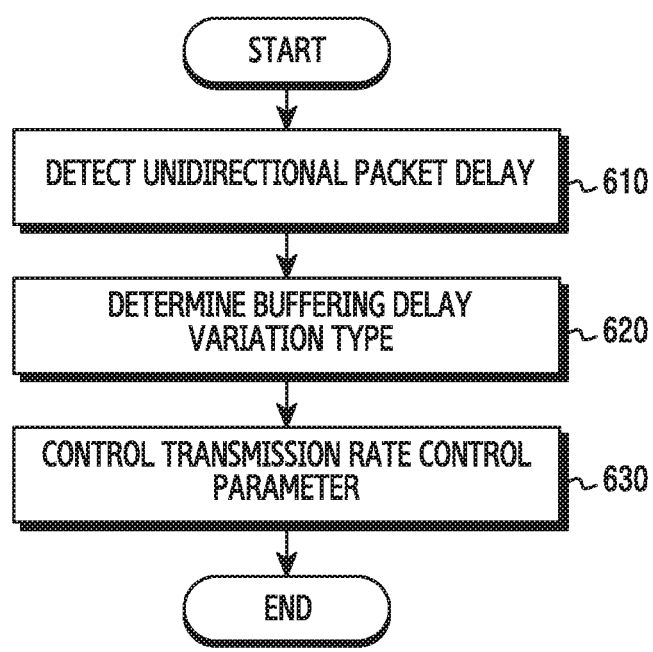
FIG. 6 is a flowchart illustrating a process for controlling a transmission rate according to an embodiment of the present disclosure.

FIG. 6 is a flowchart illustrating a process for controlling a transmission rate according to an embodiment of the present disclosure. FIG. 6 illustrates an operation method of the server 430.

Referring to FIG. 6, the server 430 detects a unidirectional packet delay time from the terminal in operation 610. At this time, the unidirectional packet delay time is the same as the sum of the buffering delay of the terminal and the uplink transmission time of the terminal. When a time stamp option of the TCP is used, the server 430 detects the unidirectional packet delay by using a difference between a time when the server receives the data packet from the terminal and a time when the terminal inputs the data packet into the buffer for transmission. When the TCP time stamp option is not used, a packet RTT between the terminal and the server is set as the unidirectional packet delay and, at this time, the RTT uses a difference between a time when the server transmits the packet to the terminal and a time when the server receives a response signal of the packet from the terminal.

In operation 620, the server 430 determines a variation type of the buffering delay. The server 430 may determine the buffering delay by using the unidirectional packet delay. The server 430 may determine the buffering delay by using a difference between the unidirectional packet delay and a minimum value of the unidirectional packet delay. The server 430 may determine the variation type of the buffering delay as a first type when the buffering delay has an increasing variation type, determine the variation type of the buffering delay as a second type when the buffering delay has a non-increasing variation type, and determine the variation type of the buffering delay as a third type when the increasing variation type or non-increasing variation type of the buffering delay is unclear.

In operation 630, the server 430 controls a parameter value for controlling the transmission rate according to the variation type of the buffering delay.

When the buffering delay is larger than a preset threshold value, the server according to an embodiment of the present disclosure controls the parameter value for controlling the transmission rate as described below. When the determined variation type of the buffering delay corresponds to the first type, the server 430 determines a control parameter by using a product of a packet reception speed and a minimum value of the RTT measured by the server. When the determined variation type of the buffering delay corresponds to the second type, the current control parameter is maintained. When the determined variation type of the buffering delay corresponds to the third type, the control parameter is determined using the product of the uplink packet reception speed and the minimum RTT.

According to an embodiment, when the buffering delay is larger than the threshold value and the determined variation type of the buffering delay corresponds to the third type, the server 430 may determine the parameter value by using a random variable.

When the buffering delay is not larger than the threshold value, the server 430 controls the parameter value for controlling the transmission rate as described below. When the determined variation type of the buffering delay corresponds to the first type, the server 430 maintains the current control parameter. When the determined variation type of the buffering delay corresponds to the second type, the server 430 increases the current control parameter by a predetermined value. When the determined variation type of the buffering delay corresponds to the third type, the server 430 increases the current control parameter by a predetermined value.

According to an embodiment, when the buffering delay is not larger than the threshold value and the determined variation type of the buffering delay corresponds to the third type, the server 430 may determine the parameter value by using a random variable.

Figure 7:
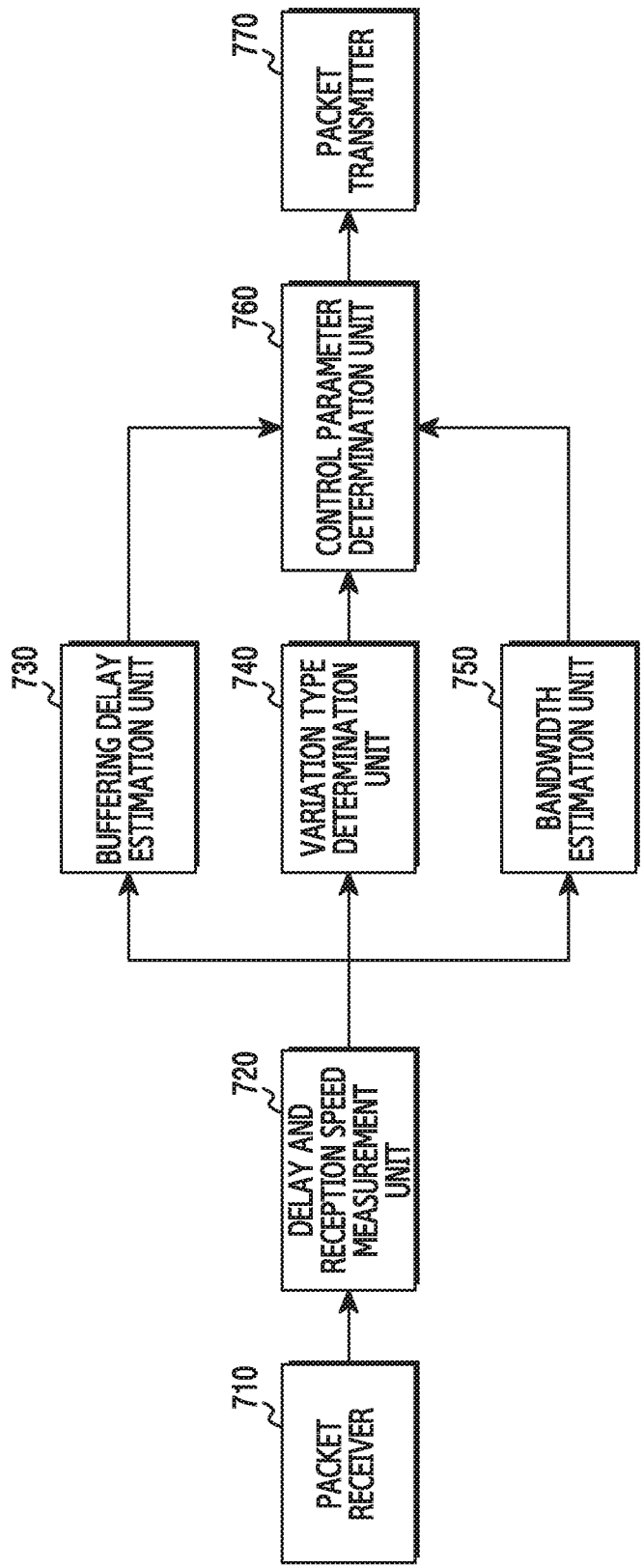
FIG. 7 is a block diagram illustrating a device for determining a transmission control parameter according to an embodiment of the present disclosure.

FIG. 7 is a block diagram illustrating a device for determining a transmission control parameter according to an embodiment of the present disclosure. FIG. 7 is a block diagram of the server 430.

Referring to FIG. 7, the device may include a packet receiver 710, a delay and reception speed measurement unit 720, a buffering delay estimation unit 730, a variation type determination unit 740, a bandwidth estimation unit 750, a control parameter determination unit 760, and a packet transmitter 770.

The packet receiver 710 may receive an uplink data packet and an ACK packet transmitted from the terminal 110. That is, the packet receiver 710 provides an interface used when the device communicates with an external device.

The delay and reception speed measurement unit 720 may measure a unidirectional packet delay from the terminal 110 to the server 430, a round trip time between the terminal 110 and the server 430, and a reception speed of an uplink data packet transmitted by the terminal 110 by using the packets received from the terminal 110.

The buffering delay estimation unit 730 may indirectly estimate a buffering time of the packet in the terminal by using the measured unidirectional packet delay and round trip time. The variation type determination unit 740 detects a variation type of the measured buffering delay. The bandwidth estimation unit 750 estimates an available uplink bandwidth based on the measured packet reception speed.

The control parameter determination unit 760 may determine a TCP control parameter optimized for a current network condition by using the estimated buffering delay, available uplink bandwidth, and variation type of the buffering delay, and then transmit information to the terminal through the packet transmitter 770.

The operation of the delay and reception speed measurement unit 720 may vary depending on whether the time stamp option of the TCP is used or not. When the time stamp option is used, a transport layer of the terminal 410 and the server 430 records a current time indicating a transmission time in a relevant field of a packet header. Further, the transport layer copies the transmission time of the reception packet recorded in the header of the received packet and records the transmission time in a relevant field of the currently transmitted packet. More specifically, before transmitting the packet to the buffer for transmission, the transport layer of the terminal 410 and the server 430 records a current time in a relevant first field (for example, $TS_{val}$) of the packet header and records the value recorded in the first field of the received packet in a second field ($TS_{ecr}$) of the packet header. For example, the terminal 110 records a current time ($T_s=X_i$) in the first field of packet X as a transmission time of the packet and inputs the time into the buffer for transmission. The buffered packet X is transmitted to the server 430 through the access network after the buffered time $b_k$. When the server 430 receives the packet X, the transport layer of the server 430 records a current reception time ($T_r=Y_{j+1}$) of the packet X. In this case, the uplink unidirectional packet delay time $Z_k$ of the packet X may be determined as Equation 1 below. That is, the uplink unidirectional packet delay time $Z_k$ may be determined by subtracting the transmission time ($T_s$) of the packet X from the current reception time ($T_r$) of the packet X. That is, the packet delay time $Z_k$ may be determined as Equation 1 below.

$$Z_k = Y_{j+1} - X_i = b_k + D_{UL} \qquad \text{Equation 1}$$

In Equation 1 above, $Z_k$ denotes a packet delay time, $Y_{j+1}$ denotes a time when the server 430 receives a data packet from the terminal 110, $X_i$ denotes a time when the terminal 110 receives an ACK packet from the server 430, $b_k$ denotes a buffering time of the terminal, and $D_{UL}$ denotes an uplink transmission time.

Further, the round trip time of the packet may be determined by recording the reception time of the packet whenever the packet is received and determining a difference between a reception of the current packet and a reception time of a previous packet by the server 430. The round trip time of the packet may be determined as Equation 2 below.

$$\text{rtt}_k = y_{j+1} - y_j \qquad \text{Equation 2}$$

In Equation 2, $\text{rtt}_k$ denotes a round trip time of the packet, $Y_{j+1}$ denotes a current reception time of the packet, $Y_j$ denotes a time when the server 430 transmits the packet to the terminal 110.

Further, the delay and reception speed measurement unit 720 may measure a reception speed by using the number of received packets for a predetermined period. For example, the reception speed $R_k$ may be determined by Equation 3 below. Here, it is assumed that the packet size is the same.

$$r_k = \frac{M \times MSS \times 8}{T} \qquad \text{Equation 3}$$

In Equation 3, $r_k$ denotes a reception speed, MSS denotes a maximum segment size indicated by bytes, T denotes a reception speed measurement period (time), and M denotes a number of packets received for one period.

The operation for determining the packet delay time by the delay and reception speed measurement unit 720 may be performed when the TCP time stamp is used. When the time stamp is not used, the operation of the delay and reception speed measurement unit 720 is described below. A plurality of current operating systems (OSs) including Linux use a TCP time stamp option to easily measure a time including a round trip time, but not all OS versions use the time stamp options. Accordingly, when the time stamp option is turned off, the server 430 according to an embodiment of the present disclosure may use the round trip time as the unidirectional packet delay time without separately measuring the unidirectional packet delay time.

The buffering delay measurement unit 730 measures a buffered time before the packet is transmitted from the terminal 110. Referring to FIG. 5, the packet delay time $Z_k$ 570 is the same as a difference between the transmission time 553 recorded before the packet is input into the transmission buffer and the time 557 when the packet is received by the server 430. When the packet is not buffered in the terminal 110, in other words, when the buffering delay $b_k$ 580 is 0, the unidirectional packet delay time $Z_k$ 570 is the same as the transmission delay time $D_{UL}$ 590. Accordingly, the server 430 according to an embodiment of the present disclosure may assume that a minimum value of a plurality of measured packet delay time is a transmission delay time $\min(Z_k)$ in a case where the buffering delay is 0, and determine the buffering delay based on the minimum value. For example, buffering delay of the terminal 110 may be determined as Equation 4 below.

$$b_k = Z_k - \min(Z_k) \quad \text{Equation 4}$$

In Equation 4, $b_k$ denotes a buffering time, $Z_k$ denotes a unidirectional packet delay time, and $\min(Z_k)$ denotes a minimum value of $Z_k$.

The variation type determination unit 740 detects a variation type of the buffering delay estimated for each of the predetermined measurement periods which can be changed. The variation type may be determined as one of a "first type" indicating an increase in the buffering delay, a "second type" indicating a non-increase in the buffering delay, and a "third type" indicating that the increase or non-increase in the buffering delay is not clear. The first type may be referred to as "increasing," the second type may be referred to as "non-increasing," and the third type may be referred to as "ambiguous."

According to an embodiment of the present disclosure, the variation type may be determined based on packet delay time of a plurality of packets. More specifically, the variation type may be estimated by quantifying a ratio of a sample (for example, buffering delay) indicating the increasing variation type within one measurement period or quantifying a difference between a first sample and a last sample included in one measurement period. Information on the quantified ratio of the sample indicating the increasing variation type within one measurement period may be referred to as "comparative metric (CM)," and information on the quantified difference between the first sample and the last sample included in one measurement period may be referred to as "differential metric (DM)."

For example, the CM may be determined as Equation 5.

$$C_M = \frac{1}{n-1} \sum_{j=2}^{n} I(X_j > X_{j-1}) \quad \text{Equation 5}$$

In Equation 5, the CM denotes the comparative metric, n denotes a number of samples within one period, and I(Y) denotes an indicator function. The indicator function has a value of 1 when the expression Y in brackets is valid, and, otherwise, has a value of 0. The CM has a value between 0 and 1, that is, $0 \leq CM \leq 1$. When samples are independent from each other, expectation E[CM] of the CM is 0.5, and, as the increasing variation type is larger, the value of the CM becomes closer to 1.

The DM may be determined as Equation 6 below.

$$D_M = \frac{(X_n - X_1)}{\sum_{j=2}^{n} |X_j - X_{j-1}|} \quad \text{Equation 6}$$

In Equation 6, the DM denotes a differential metric, n denotes a number of samples within one period, and $X_n$ denotes a value of an $n^{th}$ sample.

The DM has a value between −1 and 1, that is, $-1 \leq DM \leq 1$. When samples are independent from each other, expectation E[DM] of the DM is 0, and, as the increasing variation type is larger, the value of the DM becomes closer to 1.

In order to determine the variation type, one of the CM or the DM may be used.

For example, when the CM is used, the variation type is determined as the first type if CM>cm1, as the second type if CM<cm2, and as the third type otherwise, that is, if cm2≤CM≤cm1. Here, cm1 and cm2 are threshold values for determining the variation type and may vary depending on detailed embodiments. For example, cm1 may be set as 0.66 and cm2 may be set as 0.54.

In another example, when the DM is used, the variation type is determined as the first type if DM>dm1, as the second type if DM<dm2, and as the third type otherwise, that is, if dm2≤DM≤dm1. Here, dm1 and dm2 are threshold values for determining the variation type and may vary depending on detailed embodiments.

In another example, the CM and the DM may be used together. More specifically, when one of the CM and the DM has a variation type corresponding to the first type and the other has a variation type corresponding to the first type or the third type, the variation type is determined as the first type. When one of the CM and the DM has a variation type corresponding to the second type and the other has a variation type corresponding to the second type or the third type, the variation type is determined as the second type. When both the CM and the DM correspond to the third type, or when one of the CM and the DM corresponds to the first type and the other corresponds to the second type, the variation type is determined as the third type.

A measurement error due to context switching of an OS of a transmission optimized node which is computing equipment and an interrupt delay of network interface hardware may be masked, and a noise component included in time-series data measured for more stable variation type analysis may be removed. For example, a wavelet decomposition which is one of the de-noising schemes is applied to remove noise included in the buffering delay, and then the comparative test and the differential text may be applied.

Figure 8:
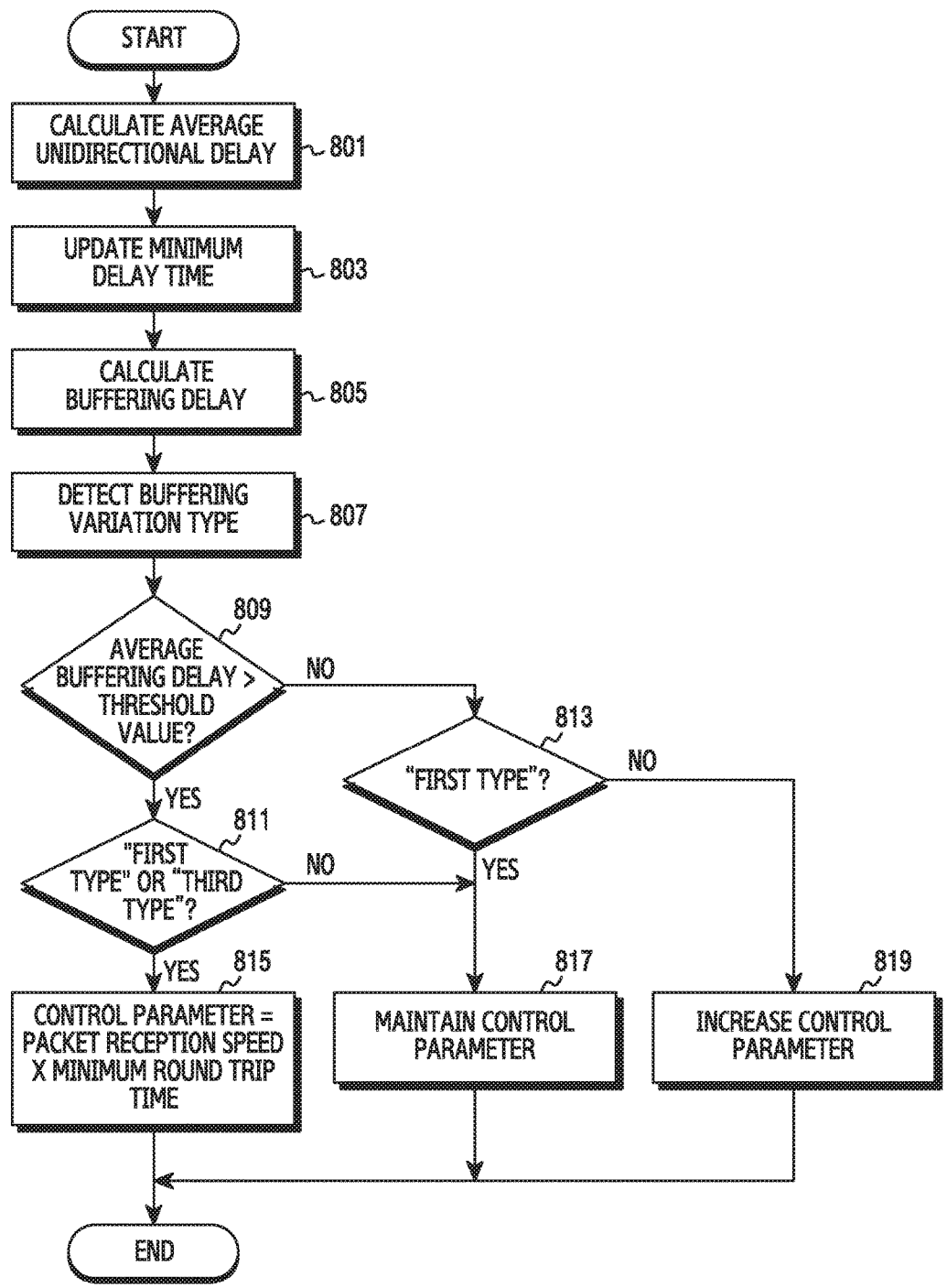
FIG. 8 is a flowchart illustrating a process of controlling a transmission rate control parameter according to an embodiment of the present disclosure.

FIG. 8 is a flowchart illustrating a process of controlling a transmission rate control parameter according to an embodiment of the present disclosure. FIG. 8 illustrates an operation method of the server 430. The process illustrated in FIG. 8 may be performed on a predetermined period. In other words, the process illustrated in FIG. 8 may be performed on a period of reception of a plurality of packets.

Referring to FIG. 8, in operation 801, the server 430 calculates an average unidirectional delay of packets received by the server 430. To this end, the server 430 may determine instantaneous unidirectional delays of the packets and then calculate an average of the unidirectional delays. Further, the server 430 calculates an average reception speed of data packets arriving at the server 430 and calculates a minimum round trip time value.

In operation 803, the server 430 updates a minimum value of the unidirectional delay value. That is, the server 430 identifies a minimum value of the unidirectional delays measured for a current period and updates a minimum value used in a previous period to be the minimum value of the current period.

In operation 805, the server 430 calculates a buffering delay of each packet delayed in the buffer of the terminal 110 and an average buffering delay. For example, the server 430 may determine the buffering delays of the packets by subtracting the minimum value from the unidirectional delays of the packets and then calculate the average of the buffering delays.

In operation 807, the server 430 detects a variation type of the buffering delays measured for the current period. The server 430 may determine the variation type based on the buffering delays. For example, the server 430 may determine the variation type by quantifying a ratio of the increasing buffering delay within the current period or quantifying a difference between a buffering delay of a first packet measured within the current period and a buffering delay of a last packet. More specifically, the server 430 may determine the variation type by determining at least one of metrics as shown in Equation 5 or 6 and comparing at least one of the metrics with a threshold value.

In operation 809, the server 430 compares the average buffering delay and the threshold value. When the buffering delay is larger than the threshold value, the server 430 identifies the variation type of the buffering delay in operation 811. When the variation type corresponds to a first type or a third type, the server 430 updates a control parameter value in operation 815. The control parameter may include a reception buffer size of the server 430. The reception buffer size may be referred to as a receive window size. For example, the server 430 may reduce the control parameter value. More specifically, the server 430 may update the control parameter value as Equation 7 below.

$$rwnd = R\_bar \times RTT\_min \qquad \text{Equation 7}$$

In Equation 7 above, rwnd denotes a control parameter value, R_bar denotes an average reception speed of data packets arriving at the server 430, and RTT_min denotes a minimum round trip time.

When the variation type does not correspond to the first type or the third type in operation 811, that is, the variation type corresponds to a second type, the server 430 maintains the current control parameter value in operation 817.

When the average buffering delay is not larger than the threshold value in operation 809, that is, the average buffering delay is equal to or smaller than the threshold value, the server 430 identifies the variation type of the buffering delay in operation 813. When the variation type corresponds to the first type, the server 430 maintains the current control parameter value in operation 817. In contrast, when the variation type does not correspond to the first type, the server 430 increases the control parameter value in operation 819. At this time, the server 430 may increase the control parameter value by one operation.

The process illustrated in FIG. 8 is expressed by Table 1 below.

TABLE 1

Figure 9:
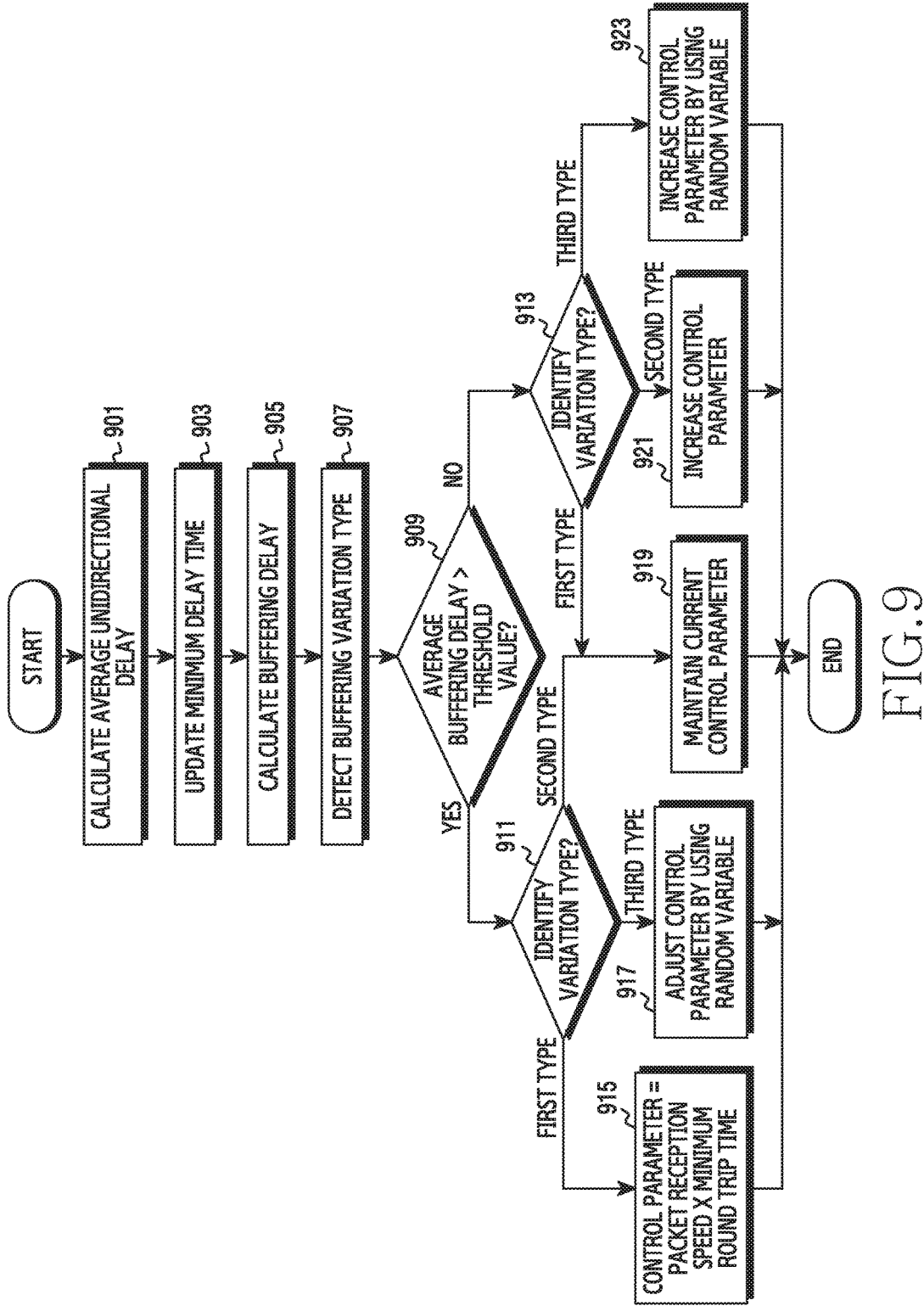
FIG. 9 is a flowchart illustrating a process of controlling a transmission rate control parameter using a random variable according to an embodiment of the present disclosure.

1. Calculate an average unidirectional delay of packets received on every period (T)
   (1) Z_bar = E[z_k(n)];
   (2) R_bar = 8*E[s_k(n)]/T; //measure receive rate
   (3) RTT_min = min (min(rtt_k(n)), RTT_min);
2. Update Z_min
   (1) Z_min_old = Z_min;
   (2) Z_min = min(Z_min_old, min(z_k));
3. Compute buffering delay
   (1) b_k = z_k − Z_min;
   (2) B_bar = E[b_k(n)];
4. Detect a variation type of unidirectional delays of packets within one period
   (1) Cm & DM calculation;
   (2) Variation type detection based on CM & DM separately;
   (3) Based on each variation type for CM & DM, determining variation type in zk for each period;
5. Control a control parameter rwnd by using B_bar and the variation type
   (1) If B_bar > Threshold,
     a) If variation type = "increasing" or "Ambiguous"
       rwnd = R_bar*RTT_min;
     b) else // Non-increasing
       Do nothing;//maintain current rwnd
   (2) If B_bar <= Threshold,
     a) If variation type = "increasing"
       Do nothing;//maintain current rwnd
     b) else // Non-increasing
       rwnd = rwnd ++;

FIG. 9 is a flowchart illustrating a process of controlling a transmission rate control parameter using a random variable according to an embodiment of the present disclosure. FIG. 9 illustrates an operation method of the server 430. The process illustrated in FIG. 9 may be performed on a predetermined period. In other words, the process illustrated in FIG. 9 may be performed on a period of reception of a plurality of packets.

Referring to FIG. 9, in operation 901, the server 430 calculates an average unidirectional delay of packets received by the server 430. To this end, the server 430 may determine instantaneous unidirectional delays of the packets and then calculate an average of the unidirectional delays. Further, the server 430 calculates an average reception speed of data packets arriving at the server 430 and calculates a minimum round trip time value.

In operation 903, the server 430 updates a minimum value of the unidirectional delay value. That is, the server 430 identifies a minimum value of the unidirectional delays measured for a current period and updates a minimum value used in a previous period to be the minimum value of the current period.

In operation 905, the server 430 calculates a buffering delay of each packet delayed in the buffer of the terminal 110 and an average buffering delay. For example, the server 430 may determine the buffering delays of the packets by subtracting the minimum value from the unidirectional delays of the packets and then calculate the average of the buffering delays.

In operation 907, the server 430 detects a variation type of the buffering delays measured for the current period. The server 430 may determine the variation type based on the buffering delays. For example, the server 430 may determine the variation type by quantifying a ratio of the increasing buffering delay within the current period or quantifying a difference between a buffering delay of a first packet measured within the current period and a buffering delay of a last packet. More specifically, the server 430 may determine the variation type by determining at least one of metrics as shown in Equation 5 or 6 and comparing at least one of the metrics with a threshold value.

In operation 909, the server 430 compares the buffering delay and the threshold value. When the buffering delay is larger than the threshold value in operation 909, the server 430 identifies a variation type of the buffering delay in operation 911. When the buffering delay is not larger than the threshold value in operation 909, the server 430 identifies the variation type of the buffering delay in operation 913.

When the variation type corresponds to a first type based on a result of the determination of operation 911, the server 430 updates a control parameter value in operation 915. The control parameter may include a reception buffer size of the server 430. The reception buffer size may be referred to as a receive window size. For example, the server 430 may reduce the control parameter value. More specifically, the server 430 may update the control parameter value as Equation 7 below.

When the variation type corresponds to a third type based on a result of the determination of operation 911, the server 430 may control the parameter value by using the random variable in operation 917. That is, the server 430 may control the control parameter value of the packet by using the random variable having an average of p. According to an embodiment of the present disclosure, the server 430 may use an equal distribution of p=0.5. According to an embodiment of the present disclosure, the server 430 may use another value of p, and use another probability distribution such as exponential distribution or Pareto distribution. For example, the server 430 determines whether to reduce the control parameter value by using a function that generates a random number according to the defined probability distribution. More specifically, after generating the random number, the server 430 may determine whether to reduce the control parameter value according to the random number and a comparison result of a probability threshold value. At this time, a result of the determination on whether to reduce the control parameter value may vary depending on the probability distribution and a detailed value of the probability threshold value. When it is determined to reduce the parameter value, the server 430 may update the control parameter value as Equation 7 below.

When the variation type does not correspond to the first type or the third type based on the result of the determination of operation 911, that is, when the variation type corresponds to a second type, the server 430 maintains the current control parameter value in operation 919. When the variation type corresponds to the first type based on a result of the determination of operation 913, the server 430 maintains the current control parameter value in operation 919.

When the variation type corresponds to the second type based on a result of the determination of operation 913, the server 430 increases the control parameter by a set value in operation 921. At this time, the server 430 may increase the control parameter value by one operation.

When the variation type corresponds to the third type based on a result of the determination of operation 913, the server 430 may increase the control parameter by using the random variable in operation 923. To this end, the control parameter value of some packets are increased using a probability distribution having an average of p (for example, 0.5). According to an embodiment, another value of p may be used, and another probability distribution such as an exponential distribution or a Pareto distribution may be used. For example, the server 430 determines whether to increase the control parameter value by using a function that generates a random number according to the defined probability distribution. More specifically, after generating the random number, the server 430 may determine whether to increase the control parameter value according to the random number and a comparison result of a probability threshold value. At this time, a result of the determination on whether to increase the control parameter value may vary depending on the probability distribution and a detailed value of the probability threshold value. When it is determined to increase the control parameter value, the server 430 may increase the control parameter value by one operation.

The process illustrated in FIG. 9 is expressed by Table 2 below.

TABLE 2

1. Calculate an average unidirectional delay of packets received on every period (T)
   (1) Z_bar = E[z_k(n)];
   (2) R_bar = 8*E[s_k(n)]/T; //measure receive rate
   (3) RTT_min = min (min(rtt_k(n)), RTT_min);
2. Upadate Z_min
   (1) Z_min_old = Z_min;
   (2) Z_min = min(Z_min_old, min(z_k));
3. Compute buffering delay
   (1) b_k = z_k − Z_min;
   (2) B_bar = E[b_k(n)];
4. Detect a variation type of unidirectional delays of packets within one period
   (1) Cm & DM calculation;
   (2) Variation type detection based on CM & DM separately;
   (3) Based on each variation type for CM & DM, determining variation type in zk for each period;
5. Control a control parameter rwnd by using B_bar and the variation type
   (1) If B_bar > Threshold,
     a) If variation type = "increasing"
       rwnd = R_bar*RTT_min;//apply to all packets until next period
     b) if variation type = "ambiguous"
       rwnd = R_bar*RTT_min with probability p;
     c) else // No variation type(generally mean no queuing)
       Do nothing;//maintain current rwnd
   (2) If B_bar <= Threshold,
     a) If variation type = "increasing"
       Do nothing;//maintain current rwnd
     b) If variation type = "Non-increasing"
       rwnd = rwnd ++ ;//apply to all packets until next period
     c) else // "Ambiguous"
       rwnd = rwnd ++ with probability p;

Although not illustrated in the drawings, the electronic device, which receives control information from the server, may receive the control information from the server and transmit an uplink packet based on the control information, and the control information may be generated to be used when the server determines a variation type of the buffering delay based on a packet transmission delay of the electronic device and controls a transmission rate of the electronic device based on the variation type.

The packet transmission delay may be a sum of the buffering delay of the terminal and an uplink delay transmission time of the terminal, and the buffering delay may be determined using a difference between the packet transmission delay and a minimum value of the packet transmission delay.

The variation type may be determined based on whether the buffering delay of each of a plurality of packets increases compared to a previous packet and, when a ratio of the packets having the increased buffering delay compared to the previous packet is larger than or equal to a threshold value, it may be determined that the variation type corresponds to the increase in the buffering delay.

The variation type may be determined based on buffering delay difference values between a plurality of packets and previous packets thereof and a buffering delay difference value between a first packet and a last packet and, when a value generated by dividing the difference value between the buffering delay of the last received packet and the first received packet among the received packets by a sum of the values generated by comparing the buffering delays of the packets and the buffering delays of the previous packets thereof is larger than a threshold value, it may be determined that the variation type corresponds to the increase in the buffering delay.

Although not illustrated in the drawings, the electronic device, which receives control information from the server, may include a receiver configured to receive control information from a server, and a transmitter configured to transmit an uplink packet based on the control information, wherein the control information may be generated to be used when the server determines a variation type of a buffering delay based on a packet transmission delay of the electronic device and controls a transmission rate of the electronic device according to the variation type.

The packet transmission delay may be a sum of the buffering delay of the terminal and an uplink delay transmission time of the terminal, and the buffering delay may be determined using a difference between the packet transmission delay and a minimum value of the packet transmission delay.

The variation type may be determined based on whether the buffering delay of each of a plurality of packets increases compared to a previous packet and, when a ratio of the packets having the increased buffering delay compared to the previous packet is larger than a threshold value, it may be determined that the variation type corresponds to the increase in the buffering delay.

The variation type may be determined based on buffering delay difference values between a plurality of packets and previous packets thereof and a buffering delay difference value between a first packet and a last packet and, when a value generated by dividing the difference value between the buffering delay of the last received packet and the first received packet among the received packets by a sum of the values generated by comparing the buffering delays of the packets and the buffering delays of the previous packets thereof is larger than a threshold value, it may be determined that the variation type corresponds to the increase in the buffering delay.

Methods stated in claims and/or specifications according to various embodiments may be implemented by hardware, software, or a combination of hardware and software.

In the implementation of software, a non-transitory computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular or plural expressions are selected to be suitable for proposed situations for convenience of description, and the present disclosure is not limited to the singular or plural elements. An element expressed in a plural form may be configured in singular, or an element expressed in a singular form may be configured in plural.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a server in a communication system, the method comprising:
   determining a buffering delay of a terminal for a data packet based on at least one of a time when the terminal inputs the data packet into a buffer of the terminal, a time when the server receives the data packet from the terminal, or a time when the terminal transmits the data packet to the server; and
   transmitting, to the terminal, control information for controlling a transmission rate of the terminal based on whether the buffering delay of the terminal for the data packet is larger than a buffering delay of the terminal for another data packet.

2. The method of claim 1, further comprising determining a transmission delay of the terminal for the data packet based on a difference between a time when the server receives the data packet from the terminal and a time when the terminal receives a packet from the server,
   wherein the buffering delay is determined based on a difference between the time when the terminal inputs the data packet into a buffer of the terminal and the time when the terminal transmits the data packet to the server.

3. The method of claim 1, further comprising:
   determining a packet round trip time between the terminal and the server as a transmission delay of the terminal for the data packet,
   wherein the packet round trip time is determined based on a difference between a time when the server transmits a packet to the terminal and a time when the server receives the data packet from the terminal.

4. The method of claim 1,
wherein a transmission delay of the terminal for the data packet corresponds to a sum of the buffering delay of the terminal and an uplink transmission delay time of the terminal, and
wherein the buffering delay of the terminal is determined based on a difference between the transmission delay of the terminal and a minimum value of the transmission delay of the terminal.

5. The method of claim 1, further comprising:
determining a variation type of the buffering delay of the terminal based on whether a buffering delay of each of a plurality of packets increases compared to previous packets; and
when a ratio of packets having an increased buffering delay compared to the previous packets is larger than a threshold value, determining that the variation type corresponds to an increase in the buffering delay.

6. The method of claim 1, further comprising:
determining a variation type of the buffering delay of the terminal based on buffering delay difference values between a plurality of packets and previous packets thereto and a buffering delay difference value between a first packet and a last packet; and
when a value generated by dividing the buffering delay difference value between a buffering delay of the last packet and the buffering delay of the first packet among the received packets by a sum of the buffering delay difference values generated by comparing the buffering delays of the packets and the buffering delays of the previous packets thereto is larger than a threshold value, determining that the variation type corresponds to an increase in the buffering delay.

7. The method of claim 1, further comprising:
determining the control information by measuring a packet reception speed,
wherein the packet reception speed is generated based on dividing a product of packets received for one period and a maximum segment size expressed by a bit value, by the period.

8. The method of claim 1, further comprising:
when the buffering delay of the terminal is larger than a threshold value and a variation type of the buffering delay corresponds to an increasing variation type of the buffering delay for a plurality of packets received from the terminal, or when the buffering delay is not determined to correspond to the increasing variation type or to a non-increasing variation type of the buffering delay, determining the control information based on a product of a packet reception speed and a minimum round trip time.

9. The method of claim 1, further comprising:
when a buffering delay of the terminal is larger than a threshold value and a variation type of the buffering delay corresponds to a non-increasing variation type, or when the buffering delay is not larger than the threshold value and the variation type of the buffering delay corresponds to an increasing variation type, determining the control information by maintaining current control information.

10. The method of claim 1, further comprising:
when the buffering delay is not larger than a threshold value and a variation type of the buffering delay does not correspond to an increasing variation type, determining the control information by increasing current control information by a predetermined value.

11. The method of claim 1, further comprising:
when a variation type of the buffering delay corresponds to a variation type, which is not determined to be an increasing or a non-increasing variation type, determining of the control information based on a random variable.

12. A method of a terminal, the method comprising:
receiving, from a server, control information for controlling a transmission rate of the terminal transmitted based on whether a buffering delay of the terminal for a data packet is larger than a buffering delay of the terminal for another data packet; and
transmitting an uplink packet based on the control information,
wherein the buffering delay of the terminal for the data packet is determined based on at least one of a time when the terminal inputs the data packet into a buffer of the terminal, a time when the server receives the data packet from the terminal, or a time when the terminal transmits the data packet to the server.

13. The method of claim 12,
wherein a transmission delay of the terminal for the data packet corresponds to a sum of the buffering delay of the terminal and an uplink transmission delay time of the terminal, and
wherein the buffering delay of the terminal is determined based on a difference between the transmission delay of the terminal and a minimum value of the transmission delay of the terminal.

14. The method of claim 12,
wherein a variation type of the buffering delay of the terminal is determined based on whether a buffering delay of each of a plurality of packets increases compared to previous packets, and
wherein, when a ratio of packets having an increased buffering delay compared to the previous packets is larger than a threshold value, it is determined that the variation type corresponds to an increase in the buffering delay.

15. The method of claim 12,
wherein a variation type of the buffering delay of the terminal is determined based on buffering delay difference values between a plurality of packets and previous packets thereto and a buffering delay difference value between a first packet and a last packet, and
wherein, when a value generated by dividing the buffering delay difference value between a buffering delay of the last packet and the buffering delay of the first packet among the packets received by the server, by a sum of the values generated by comparing the buffering delays of the packets and the buffering delays of the previous packets thereto, is larger than a threshold value, it is determined that the variation type corresponds to an increase in the buffering delay.

16. A server in a communication system, the server comprising:
at least one processor configured to:
determine a buffering delay of a terminal for a data packet based on at least one of a time when the terminal inputs the data packet into a buffer of the terminal, a time when the server receives the data packet from the terminal, or a time when the terminal transmits the data packet to the server; and
a transceiver configured to transmit, to the terminal, control information for controlling a transmission rate of the terminal based on whether the buffering delay of the terminal for the data packet is larger than a buffering delay of the terminal for another data packet.

17. The server of claim 16, wherein the at least one processor is further configured to determine a transmission delay of the terminal for the data packet based on a difference between a time when the server receives the data packet from the terminal and a time when the terminal receives a packet from the server,
   wherein the buffering delay is determined based on a difference between the time when the terminal inputs the data packet into a buffer of the terminal and the time when the terminal transmits the data packet to the server.

18. The server of claim 16,
   wherein the at least one processor is further configured to determine a packet round trip time between the terminal and the server as a transmission delay of the terminal for the data packet, and
   wherein the packet round trip time is determined based on a difference between a time when the server transmits a packet to the terminal and a time when the server receives the data packet from the terminal.

19. The server of claim 16,
   wherein a transmission delay of the terminal for the data packet is determined based on a sum of the buffering delay of the terminal and an uplink transmission delay time of the terminal, and
   wherein the buffering delay of the terminal is determined based on a difference between the transmission delay of the terminal and a minimum value of the transmission delay of the terminal.

20. The server of claim 16, wherein the at least one processor is further configured to:
   determine a variation type of the buffering delay of the terminal based on whether a buffering delay of each of a plurality of packets increases compared to previous packets, and
   when a ratio of the packets having an increased buffering delay compared to the previous packets is larger than a threshold value, determine that the variation type corresponds to an increase in the buffering delay.

* * * * *